Patented June 3, 1941

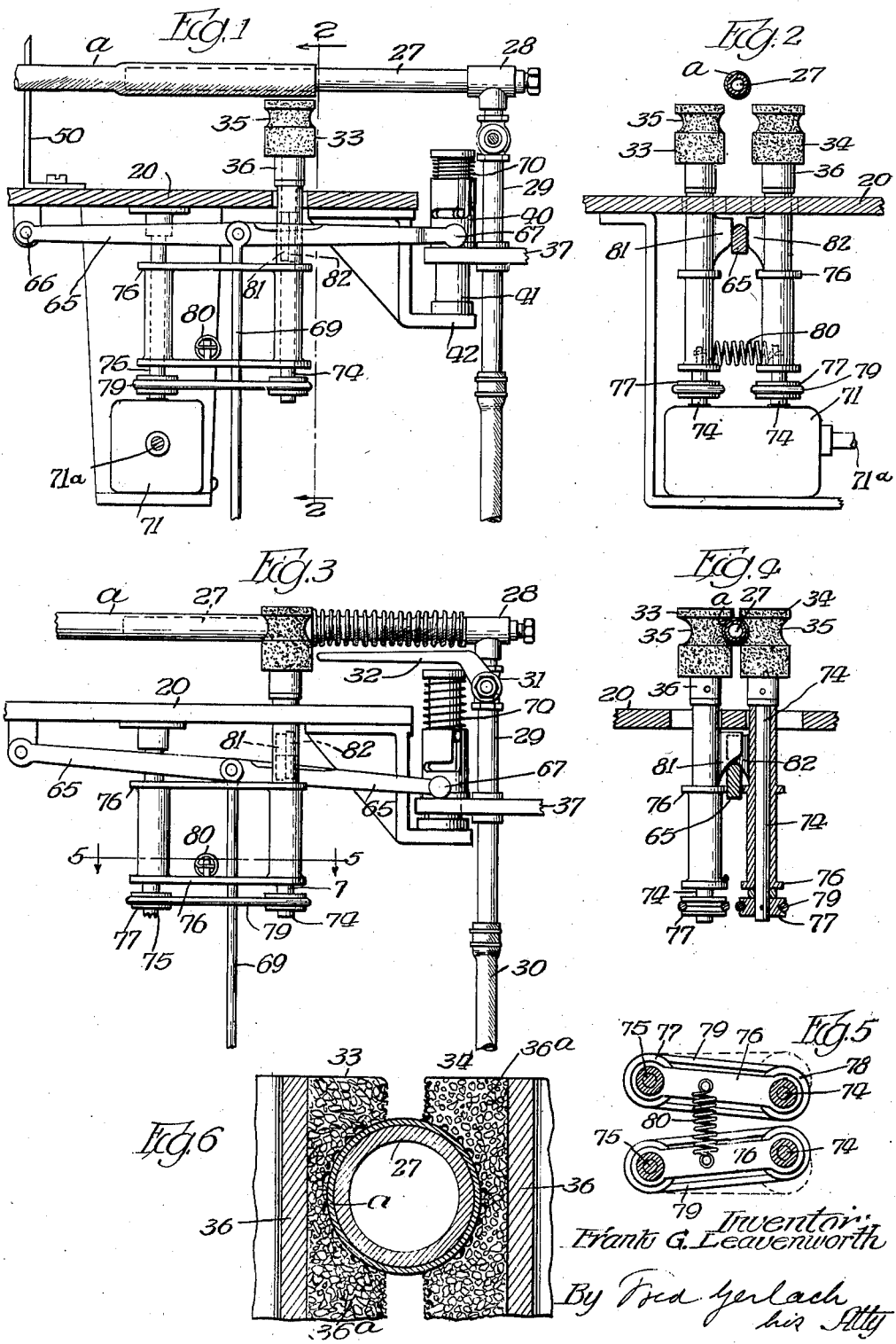

2,244,560

UNITED STATES PATENT OFFICE 2,244,560

INTESTINE FEEDING MECHANISM

Frank G. Leavenworth, Elmhurst, Ill.

Original application September 23, 1937, Serial No. 165,329. Divided and this application December 26, 1939, Serial No. 310,902

5 Claims. (Cl. 17—42)

The invention relates to apparatus for handling intestines used for sausage casings.

In inspecting or measuring animal intestines for use as sausage casings, it is necessary to advance the intestine through the inspection or measuring apparatus. In practice, it has been found that the rolls heretofore used for feeding the intestine were formed of material or required such pressure as would, in many instances, rupture the intestine particularly those portions which have thin walls.

The object of the invention is to provide improved feed-rolls which will effectively grip the casing so it will be reliably advanced without tearing or rupturing the walls thereof.

This object is attained primarily by forming the peripheral portions of feed-rolls which engage the casing and which are pressed against it, of material which will produce suction-pockets between the intestine and the periphery to supplement the frictional engagement of the roll and the intestine and cause the latter to be advanced without danger of tearing or rupturing the intestine.

The present application is a division of an application which was filed by me September 23, 1937, Serial No. 165,329 and on January 23, 1940 matured into United States Letters Patent No. 2,187,790.

The invention consists in the several novel features which are hereinafter set forth and are more particularly defined by claims at the conclusion hereof.

In the drawing: Fig. 1 is a side elevation of a portion of the inspecting apparatus, the feed-rolls being shown in inoperative position. Fig. 2 is a section taken on line 2—2 of Fig. 1. Fig. 3 is a view similar to Fig. 1 illustrating the feed-rolls in operative relation to the intestine. Fig. 4 is a section on line 4—4 of Fig. 3. Fig. 5 is a section taken on line 5—5 of Fig. 3. Fig. 6 is a detail section on an enlarged scale of the feed-rolls engaging an intestine on a core.

The invention is exemplified in apparatus comprising a table 20, a hollow core 27 onto which the intestine $a$ is to be fed after inspection or measurement, and a pair of feed-rolls 33, 34 adapted to engage the intestine and the core and to feed it thereon. The core is formed of a hollow tube, one end of which is secured in a fitting 28. Said fitting is secured to the upper end of a pipe-standard 39 which is secured in a pivotally and vertically movable support 37. The free end of core 27 is adapted to receive and fit into the leading end of the casing when it is manually placed thereon. A flexible water-pipe 30 is connected to the lower end of pipe-standard 29 for delivering water through core 27 into the portion of the casing $a$ to distend or deflate the casing for inspection. Pipe-standard 29 is provided with a valve 31 with a handle 32 for controlling the delivery of water into the casing and this valve is provided with a handle 32.

Feed-rolls 33 and 34 are adapted to engage the opposite sides of and to string the casing onto the core. Each of these feed-rolls comprises a hub 36 and a peripheral member 36$^a$ which is formed of sponge-rubber. Each member 36$^a$ is formed with an annular concave groove 35 to fit around the sides of the core and engage the intestine thereon.

Support 37 is vertically movable so that the core may be lowered into the horizontal plane of the grooves 35 in the feed-rolls and raised above the plane of the feed-rolls, where it will be free to swing laterally to permit the removal of the casing from the core. A sleeve 40 fixed to support 37 is slidable on a standard 41 which is mounted on a bracket 42 which is fixed to table 20. Means for lowering the support 37 to bring the core into and out of operative relation with the feed-rolls 33, 34 comprises a lever 65 which is fulcrumed at 66 and is provided with an abutment 67 for engaging support 37 to force it downwardly, and a link 69 connected to lever 65. The link 69 may be operated by a pedal, as illustrated in said Patent No. 2,187,790. A spring 70 is applied to hold the table normally raised and lift it when the pedal is released by the operator. When support 37 and core 27 are to be lowered, the operator will operate link 69 downwardly and, when the link 69 is released, support 37 will be restored to its raised position by spring 70. Support 37 is pivoted for a limited horizontal movement on standard 41, so that the core can be swung forwardly into position where the casing can be stripped from the core.

The hub of each of the feed-rolls is fixed to a vertical shaft 74. Said shafts are journaled in brackets 76, respectively, which are adapted to swing horizontally on drive-shafts 75 to permit the feed-rolls to be moved by the latter to clear and permit the vertical movement of the core and casing thereon. A spring 80 between brackets 76 is provided to press the feed-rolls against the casing on core 27. When the brackets 76 are free to be swung inwardly by spring 80 and the core is lowered, the rolls will be pressed against the casing which are driven to advance the casing and string it onto the core.

An important characteristic and advantage resulting from the use of peripheries formed of material such as sponge-rubber, is that when the feed-rolls are pressed against the casing on the core, the cavities in the sponge-rubber will produce suction effects between the casing and the rolls and cause the casing to be efficiently gripped and positively advanced on the core without slippage between the feed-rolls and the casing and without any tendency to tear or rupture the casing-walls.

The shafts 75 are driven by power from suitable gearing in a box 71 which is driven by a shaft 71ª which may be driven by an electric motor, as exemplified in the aforesaid Patent No. 2,187,790. Said gearing is connected to drive both vertical shafts 74 on which brackets 76 are pivoted. Shafts 75 are driven from shafts 74, respectively, by belt-pulleys 77, belts 79 and belt-pulleys 78. This mechanism drives the feed-rolls continuously and permits them to be spread apart so the core and intestine, while they are being lowered to the operative plane of the rolls and raised into inoperative position, can pass between the rolls.

The feed-rolls are automatically spread apart when the core is raised and released so they will be moved together by spring 80 when the core is in its lowered position, by inclined cams 81, 82 on brackets 76, respectively, which are engaged by lever 65, as said lever is moved upwardly to raise the core 27 and released when the lever is lowered. As lever 65 is raised, the feed-rolls will be initially spread apart by said lever and cams 81, 82, and while the lever remains raised the rolls will be held apart by the upper straight portions of cams 81, 82.

The operation of the apparatus will be as follows: The leading end of an intestine will be strung onto the core 27 so it will be disposed between the vertical planes of the rolls. Valve 31 will then be operated to fill the intestine with water and inflate a portion thereof for inspection. While lever 65 is raised it will engage cams 81, 82 on brackets 76 and hold the feed-rolls spread apart so that the core can be lowered between them. The operator will next depress the pedal to swing lever 65 downwardly and lower support 37 and core 27 so that the latter will be disposed in the horizontal plane of the grooves 35 in the feed-rolls. During the last portion of the downward movement of lever 65 it will release cams 81, 82 and render the spring 80 effective to press brackets 76 and shafts 74 together so that the feed-rolls will yieldingly grip and their peripheries will be pressed against the casing on the core. During this operation the pressure of the rolls against the casing on the core will cause the pockets or pores in the sponge-rubber peripheries to be evacuated and produce suction-effects therein and so that the intestine will be fed forward without any tendency to tear or rupture the wall of the casing. The feed-rolls will be operated continuously so that as soon as they are in engagement with the casing on the core they will be strung onto the core. When the casing has been completely strung onto the core the pedal will be released to raise the core so that it can be swung laterally into convenient position for the removal of the casing therefrom.

The invention exemplifies improved means for feeding intestines in the apparatus for inspecting or measuring them, which avoids any tearing or rupture of the walls of the intestines by the feed-means.

The invention is not be to be understood as restricted to the details set forth, since these may be modified within the scope of the appended claims, without departing from the spirit and scope of the invention.

Having thus described the invention, what I claim as new and desire to secure by Letters Patent is:

1. Feed-means for intestines comprising a feed-roll provided with a periphery for engaging the intestine and formed of elastic material having pores therein adapted to produce vacuum effects between the wall of the intestine and the roll as the periphery is pressed into engagement with said wall, and means for driving the roll.

2. Feed-means for intestines comprising a pair of feed-rolls mounted to engage opposite sides of the intestine, each provided with a periphery for engaging the intestine and formed of elastic material having pores therein adapted to produce vacuum effects between the wall of the intestine and the roll as the periphery is pressed into engagement with said wall, and means for simultaneously driving the rolls.

3. Feed-means for intestines comprising a feed-roll provided with a periphery for engaging the intestines and formed of sponge-rubber having pores therein adapted to produce vacuum effects between the wall of the intestine and the roll as the periphery is pressed into engagement with said wall, and means for driving the roll.

4. Feed-means for intestines comprising a pair of feed-rolls mounted to engage opposite sides of the intestine, each provided with a periphery having an annular concave groove therein for engaging the intestine and formed of sponge-rubber having pores therein adapted to produce vacuum effects between the wall of the intestine and the roll as the periphery is pressed into engagement with said wall, and means for simultaneously driving the rolls.

5. The combination of a core adapted to enter an intestine and rolls on opposite sides of, and for feeding the intestine on the core, each roll being provided with a periphery for engaging the intestine and formed of elastic material having pores therein adapted to produce vacuum effects between the wall of the intestine and the roll as the periphery is pressed into engagement with said wall, spring-means for pressing the rolls together, and means for driving the rolls.

FRANK G. LEAVENWORTH.